W. S. BECHTOLD.
ARTICLE OF MANUFACTURE.
APPLICATION FILED MAR. 30, 1922.
1,435,911. Patented Nov. 21, 1922.
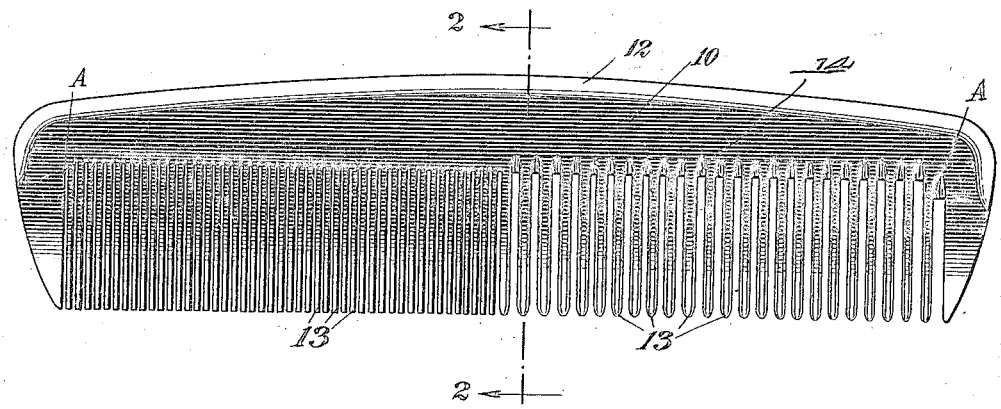
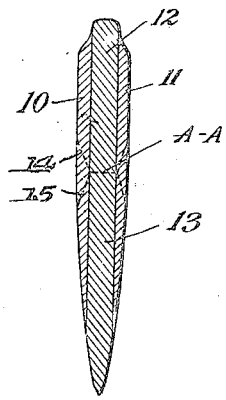

Patented Nov. 21, 1922.

1,435,911

UNITED STATES PATENT OFFICE.

WILLIAM S. BECHTOLD, OF NEWARK, NEW JERSEY.

ARTICLE OF MANUFACTURE.

Application filed March 30, 1922. Serial No. 547,972.

*To all whom it may concern:*

Be it known that I, WILLIAM S. BECHTOLD, a citizen of the United States, residing at Newark, in the county of Essex and State of New Jersey, have invented new and useful Improvements in Articles of Manufacture, of which the following is a full, clear, and exact specification.

My invention relates to articles of celluloid-like composition and refers particularly to multi-colored articles of that description.

Celluloid and similar material are well adapted for the production of many articles, particularly so-called toilet articles, on account of its ease of manipulation, durability and capability of producing artistic effects, and hence, they have been largely adopted for articles of this character.

It is essential that articles of this general class be strong, durable and free from tendency to warp and it is further advantageous that they be of artistic appearance, especially as regards their color or colors.

The device of my invention possesses all of these desirable characteristics and presents a means for the production of such articles in an economic manner.

I have found that articles of superior durability and freedom from warping can be produced by the proper cementing together of a plurality of layers of celluloid, or similar material, in which the inner layer, or layers, extend outwardly beyond the exterior layers and I have further found that when layers of different colors are thus employed it is possible to produce artistic and attractive color effects not otherwise obtainable.

The value of my invention, particularly as it refers to color effects, will be evident upon a consideration of the elements of my invention and the class of articles to which it refers.

In the commercial application of my invention, I prefer to employ three layers of celluloid, or similar material, the two outer layers being of practically the same color, while the inner layer is of a different color, the inner layer extending beyond the two exterior layers.

By this means, I am able to obtain a device free from danger of warping because of the overlying layers of material and which will have a similar multi-colored effect upon both sides of the article.

My invention is particularly adopted for the production of combs, in which case stability and flexibility are produced at the requisite portions thereof, with the further production of desirable and artistic color effects not otherwise producible.

In combs of this character, it is desirable that the back, or base, of the comb be as stiff and non-resilient as possible, whereas the teeth of the comb should have a certain amount of flexibility, or resiliency, in order that they may not have a harsh effect upon the hair through which they are drawn.

The combs of my invention have both of these valuable attributes.

In producing the combs of my invention, I employ a blank composed of three layers of celluloid, or similar material, cemented together, the inner layer being of a different color from the two outer layers.

For purposes of illustration, it may be assumed that the two outer layers are of a tortoise-shell color and the inner layer of a clear amber color.

The back of the comb comprises the three layers of the material, preferably having the inner layer extend beyond the outer layers along the run of the back, thus giving that portion of the comb the full rigidity and freedom from warping of the three layer material.

The teeth of the comb are formed by a gradually increasing wearing away of the two outer layers, thus bringing the teeth into an approximately pointed condition, while allowing the actual ends of the teeth to be rounded to prevent the scratching or cutting of the head when applied.

The thickness of the layers and the pitch of the incline of the teeth are so arranged that, while the upper portion of the teeth carry the full thickness of the outer layers, these layers gradually decrease and are entirely removed before the end of the teeth is reached.

The physcial effect of this formation is that, while the upper portion of the teeth have the full rigidity of the three layers, this gradually decreases until the lower portion of the teeth consist of only the inner layer and thus have considerable flexibility.

The optical effect of this formation, in the example given, is that the shell color effect of the back and upper portion of the teeth gradually disappears and is blended into a pure amber color at their lower portions, the artistic effect being enhanced by the fact that there is no abrupt line of demarkation between the two colors.

A consideration of the above and of the accompanying drawings and description will evidence the novelty of my invention and its usefulness and attractiveness.

In the accompanying drawings, illustrating one form of a device of my invention, similar parts are designated by similar numerals.

Figure 1 is a side plan view of a comb illustrating my invention.

Figure 2 is a cross-section through the line 2—2 of Figure 1.

The illustrated device showing a comb formed of three cemented layers of celluloid comprises the exterior layers 10 and 11 of a similar dark shell color and an inner layer 12 of a clear amber color, the three layers being cemented together.

In the upper portion of the back, or base, of the comb, the inner layer 12 extends beyond the two exterior layers 10 and 11.

Below the line A—A, the celluloid material is cut, or formed, into a plurality of teeth 13, 13, the outer faces of which are gradually reduced until the lower portions of the two exterior layers 10 and 11 are entirely removed, thus allowing the inner layer 12 to be exposed beyond the two exterior layers 10 and 11. In the formation of the teeth the back is cut away at 14 and the teeth slightly cut away at 15.

It will thus be seen that by this means of construction, the back and upper portions of the teeth have the full rigidity of the three layers of material while the teeth have a gradually increased resiliency, or flexibility, until they have finally the full flexibility of the inner layer.

It will be further seen that the back will have the shell-color effect, topped by the extended amber color, and this shell color will gradually blend into the amber color along the teeth faces, there being no decided line of demarkation between the two, this appearance being further enhanced by the semi-transparency of the celluloid.

By "celluloid" in my specification and claims, I mean celluloid or any other substance, or material, suitable for the carrying out of my invention.

I do not limit myself to the particular size, shape, number, color, composition or arrangement of parts, nor to the particular article of manufacture shown in the accompanying drawings, which are illustrated simply as a means for clearly demonstrating my invention.

What I claim is:—

1. In an article of manufacture, in combination, a comb comprising an interior layer of celluloid and two exterior layers of celluloid of different color from that of the interior layer, the thickness of the exterior layers being gradually decreased causing an exposure of the interior layer.

2. In an article of manufacture, in combination, a comb comprising a back composed of three thicknesses of celluloid and a plurality of teeth upon at least a portion of the faces of which the exterior layers are gradually decreased in thickness, causing an exposure of the interior layer.

3. In an article of manufacture, in combination, a comb comprising a back composed of three thicknesses of celluloid of varied colors and a plurality of teeth upon at least a portion of the faces of which the exterior layers are gradually decreased in thickness, causing an exposure of the interior layer.

4. In an article of manufacture, in combination, a comb comprising a back composed of three thicknesses of celluloid of varied colors having an exposed portion of the inner layer extending beyond the exterior layers and a plurality of teeth upon at least a portion of the faces of which the exterior layers are gradually decreased in thickness, causing an exposure of the interior layer.

Signed at New York city in the county of New York and State of New York this 28th day of March, 1922.

WILLIAM S. BECHTOLD.